July 7, 1931.  H. C. FORD  1,813,534
FIRE CONTROL SYSTEM
Filed Oct. 16, 1924    7 Sheets-Sheet 1

INVENTOR.
BY Hannibal C. Ford,
Moakley and Gill
ATTORNEYS.

July 7, 1931.  H. C. FORD  1,813,534
FIRE CONTROL SYSTEM
Filed Oct. 16, 1924    7 Sheets-Sheet 3

INVENTOR.
Hannibal C. Ford,
BY
Moakley and Gill
ATTORNEYS.

July 7, 1931.    H. C. FORD    1,813,534
FIRE CONTROL SYSTEM
Filed Oct. 16, 1924    7 Sheets-Sheet 4

INVENTOR.
Hannibal C. Ford,
BY Moakley and Gill
ATTORNEYS.

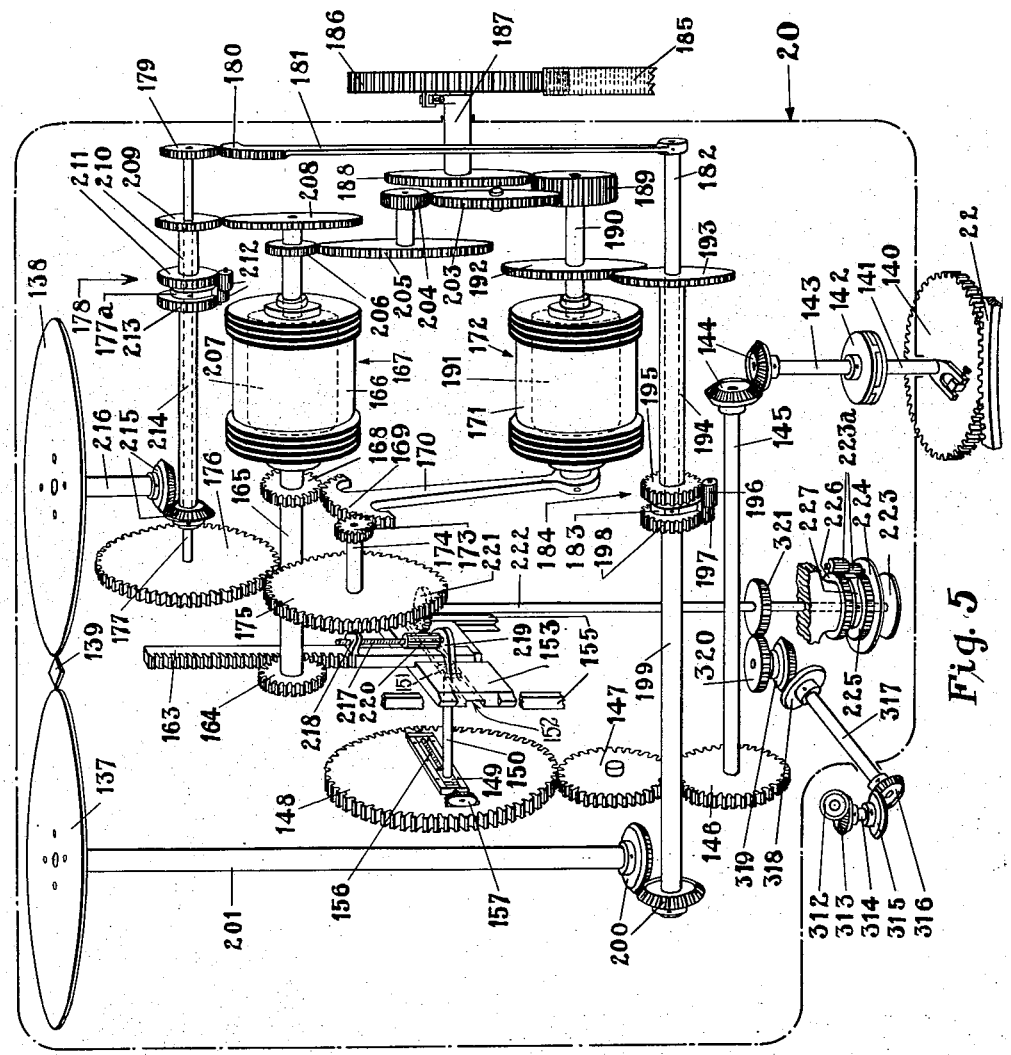

July 7, 1931.   H. C. FORD   1,813,534
FIRE CONTROL SYSTEM
Filed Oct. 16, 1924   7 Sheets-Sheet 6
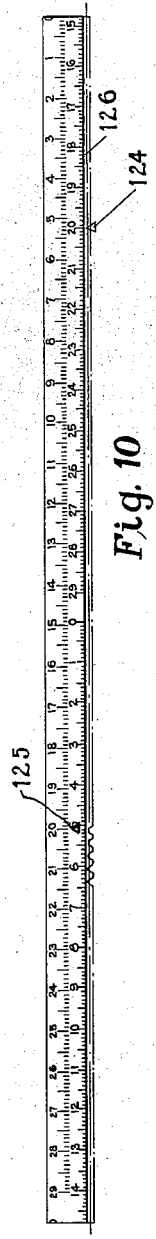
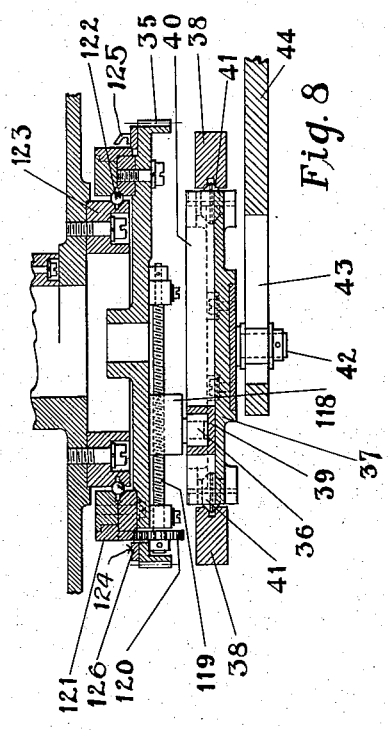
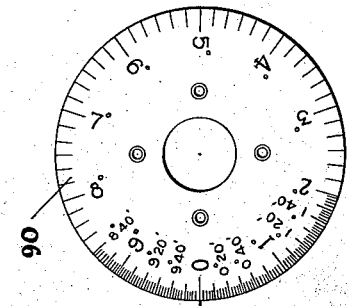
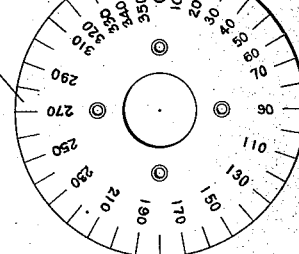
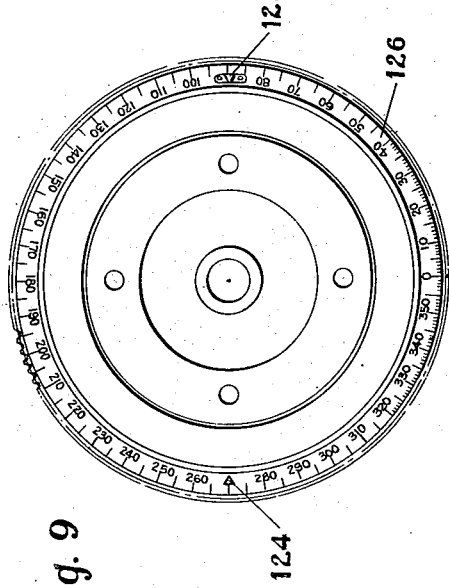
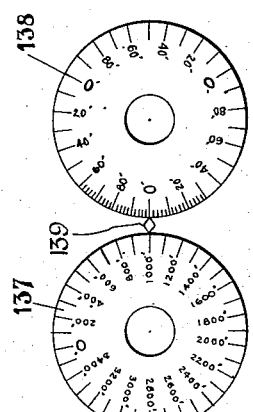
INVENTOR.
Hannibal C. Ford,
BY Moakley and Gill
ATTORNEYS.

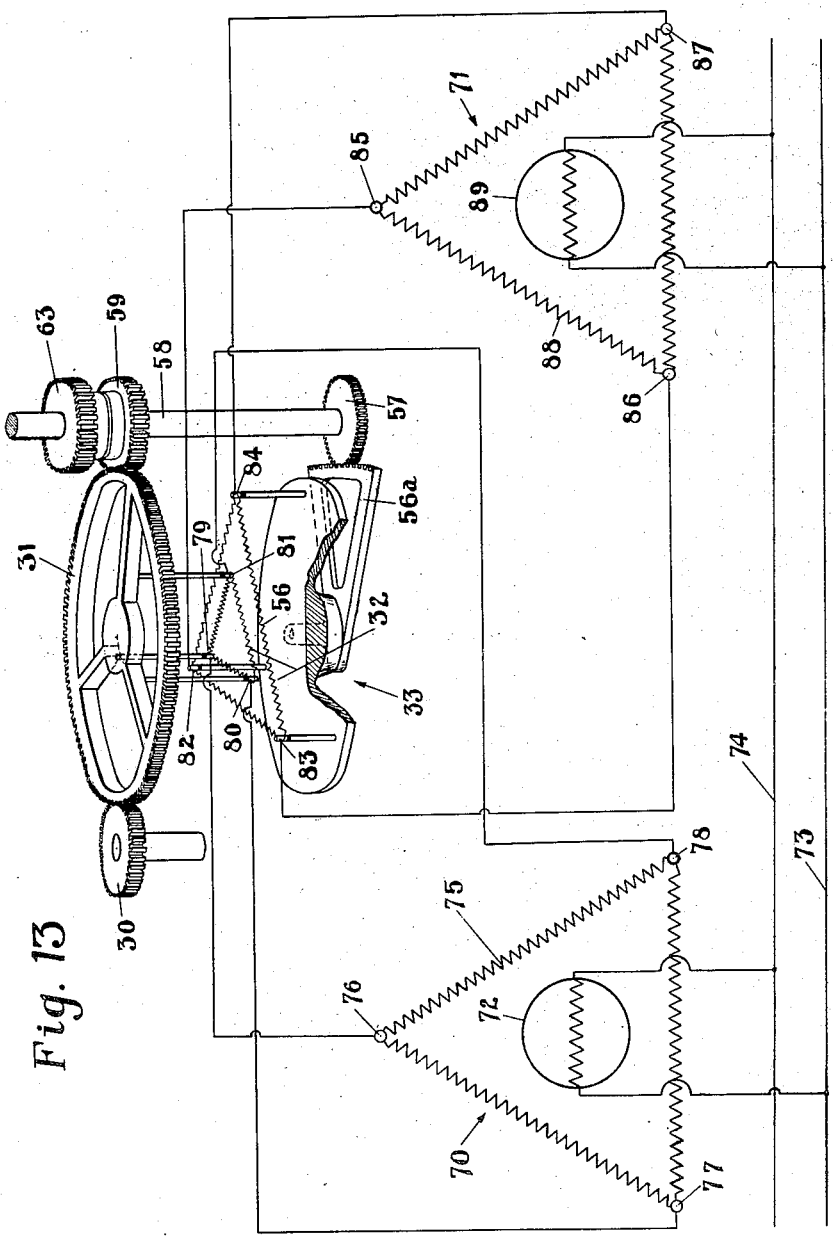

Patented July 7, 1931

1,813,534

UNITED STATES PATENT OFFICE

HANNIBAL C. FORD, OF JAMAICA, NEW YORK, ASSIGNOR TO FORD INSTRUMENT COMPANY, INC., OF LONG ISLAND CITY, NEW YORK, A CORPORATION OF NEW YORK

FIRE CONTROL SYSTEM

Application filed October 16, 1924. Serial No. 744,051.

This invention relates to signal systems for controlling the training and elevating of guns from a director station.

At the present time it is customary to control the training and elevating of the guns of war ships, except possibly those of small calibre, from fire-control stations provided with instruments called directors from which indications of the train and elevation required for the guns are sent by suitable signal transmission systems. As the guns are located at different points on the ship their distances and bearing from the director station are different and their lines of fire with respect to the line of sight at the director also vary, thus introducing errors, known as parallax errors, which are also affected by changes in range of the target. The direction and amount of gun train transmitted from the director station are therefore, not in general correct for any particular gun, and certain corrections must be made to compensate for the parallax effects arising from the difference in direction of the lines of sight from the director station, and the line of fire of the gun to the target. As these errors are different for different guns each receiving instrument requires adjustment to compensate for such conditions at the gun with which it is associated.

Directions for elevation, usually in minutes of arc, are also transmitted from the director station to each gun. With continuing use of a gun there is a gradual loss in muzzle velocity caused by erosion of the bore of the gun. A correction in elevation depending upon the number of rounds fired and the range must therefore be applied to the indications received from the director station.

A general object of the present invention is to provide a fire-control system in which the values of the required corrections are continuously computed and corresponding correctional alterations in the directions for training and elevating the guns are simultaneously effected.

More specific objects of the invention are to provide a signal system to furnish at each gun accurate directions for gun-sighting; means for concomitantly computing and making parallax corrections in such a system; means for concomitantly computing and making erosion corrections in such a system; means for computing gun train adjustments and gun elevation adjustments in accordance with range values and rounds-fired values set up in such computing means and a device, actuable by setting up the values of certain quantities therein, to compute a function of such values.

With these and other objects in view the invention consists of the construction and combinations which will be hereinafter set forth and will be particularly pointed out in the appended claims;

Figure 5 is a schematic view in elevation of the gun elevation repeat back instrument;

Figure 6 is a view of the dials used in setting the gun elevation repeat back instrument for the inclination of the roller path of the gun;

Figure 7 is a sectional view taken along a horizontal plane passing through the center of the dials in Figure 6.

Figure 8 is a sectional view of the device for adjusting the gun train repeat back for the parallax base length and the parallax base angle.

Figure 9 is a detail view showing the parallax base angle scale.

Figure 10 represents a development of the double scale used in the parallax base length adjustment;

Figure 11 is a detail showing the arrangement of dials for indicating the gun train in degrees and minutes of arc;

Figure 12 is a detail showing the arrangement of dials for indicating the gun elevation in minutes of arc; and Figure 13 is a diagrammatic view of a portion of the system.

Figure 1:
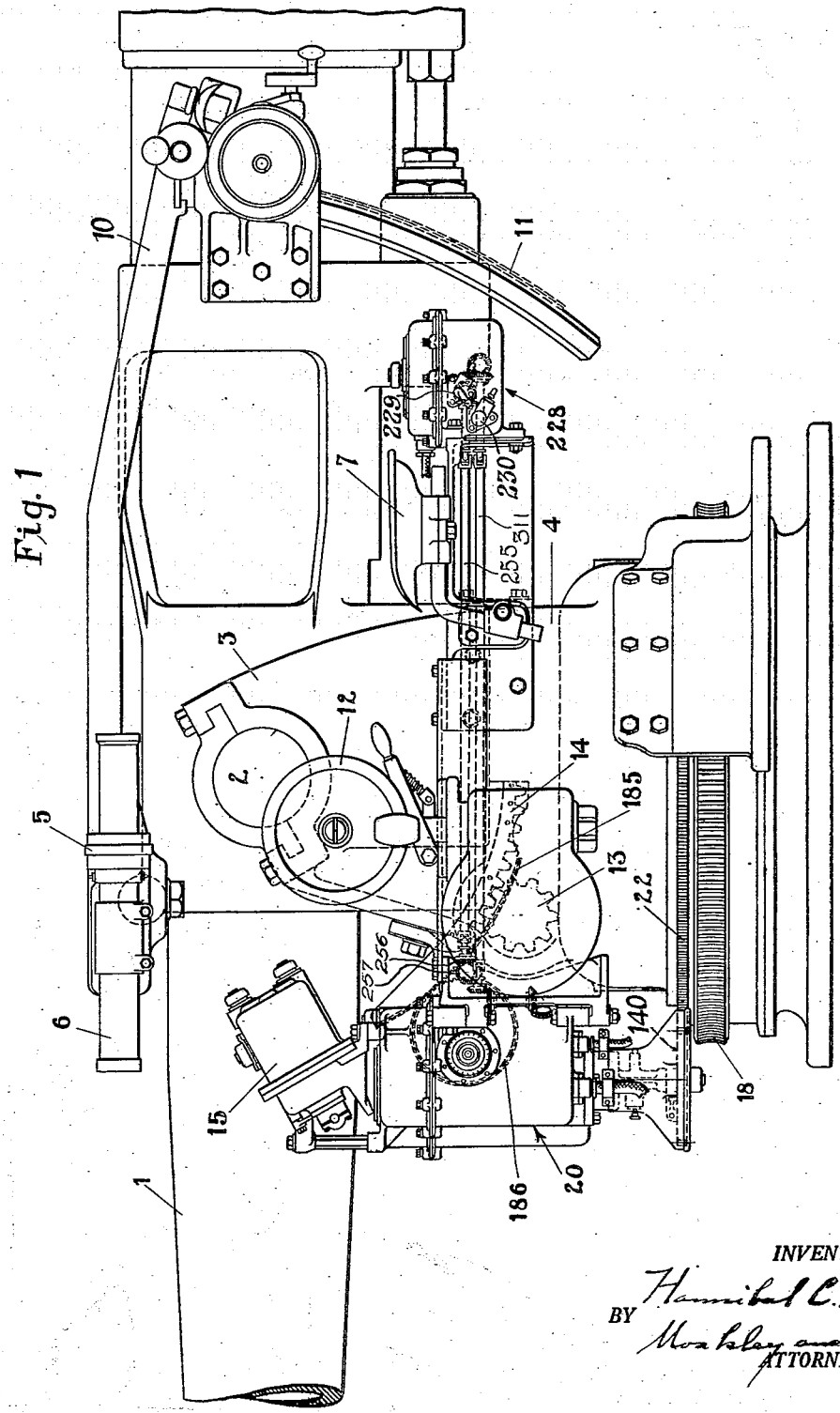
Figure 1 is a side elevation of a gun to which the invention is applied.

The invention is illustrated in connection with a gun 1 mounted by trunnions 2 in standards 3 of a carriage 4 mounted for rotation about a vertical axis. Associated with the gun is a gun-sight 5 carrying at the left a telescope 6 for use by a gun pointer occupying a seat 7 at the left of the gun and a telescope 8 for use by a gun trainer standing on a platform 9 on the gun carriage at the right of the gun. The gun-sight 5 is pivotally mounted at its forward end and comprises a rearwardly extending frame 10 provided with an arcuate rack 11 which may be actuated by suitable means to swing the gun-sight about its pivotal axis as required.

In sighting the gun, the gun pointer actuates a hand wheel 12 and through connections not shown rotates a pinion 13 meshing with a gun elevation rack 14 connected with the gun 1. The operation of the hand wheel 12 is continued until a zero reading appears in a gun elevation indicator 15. The training of the gun may be effected at the same time by turning a hand wheel 16 which acts through means not shown to turn a worm 17 meshing with a gun train gear 18, the turning of the hand wheel being continued until a gun train indicator 19 shows a zero reading. The gun elevation and gun train indicators 15 and 19 respectively, are operated from a director station, not shown, by an electric transmission system such as a so-called Selsyn system which will be more fully disclosed hereinafter.

The director station contains a coarse and a fine Selsyn transmitter or generator connected for each gun, with coarse and fine transformers in an instrument 20, known as a gun elevation repeat back and through said transformers, with receiver motors in the gun elevation indicator 15. The director station also contains a coarse and a fine transmitter or generator connected for each gun with coarse and fine transformers in a gun train repeat back instrument 21, and through the transformers with coarse and fine receiver motors in the gun train indicator 19. The connections between the transmitters or generators in the director station and the receiver motors in the gun elevation and gun train indicators, through the transformers in the gun elevation and gun train repeat back instruments, will be brought out hereinafter.

Immediately above the gun train gear 18 is an instrument train gear 22 meshing with a gear 23 through which the gun train repeat back instrument is controlled in accordance with the training of the gun. The gear 23 acts through a shaft 24, coupling 25, shaft 26, and gears 27 and 28 to turn a shaft 29 carrying a gear 30 meshing with a gear 31 fixed to a rotor 32 of a Selsyn transformer 33. Fixed on the shaft 29 is a gear 34 meshing with a training angle gear 35 from which motion is transmitted by an eccentric pin 36 to a carriage 37 mounted to move along tracks 38. As shown in Fig. 8 the pin 36 extends into a block 39 guided in a groove or path 40 in the training angle carriage 37 which is guided in the tracks 38 by means of wheels or slides 41. Projecting from the opposite side of the carriage 37 is a pin or stud 42 which projects through a slot 43 in a parallax lever 44 mounted to swing about a pin 45 extending through a slot 46, the parallax lever 44 being connected at the end opposite the slot 43 by means of a pin 47 to a second carriage 48 movable along guides 48A. Fixed to the parallax carriage 48 is a cam 49 engaging a roller 50 on an arm 51 to rock a shaft 52 and through an arm 53 fixed on shaft 52 to reciprocate a link 54 and thereby actuate an arm 55 attached to stator 56 of the transformer 33 to turn the same. The arm 55 is also connected with a toothed sector 56a meshing with a gear 57 fixed on a shaft 58. Loosely mounted on the shaft 58 is a gear 59 meshing with the gear 31 and with a small gear 60 on a spider 61 fixed on shaft 58. Meshing with the small gear 60 is another small gear 62 mounted on the spider 61 and meshing with a gear 63 loose on the shaft 58 and connected by a sleeve 64 with a gear 65 which is controlled through the differential gear 65a just described, in accordance with the positioning of rotor 32 and stator 56 of the transformer 33. The gear 65 meshes with a gear 66 which is connected by a shaft 67 with a coarse dial 68 graduated in ten degree steps, as shown in Fig. 11 and of which the position may be read by means of the adjacent end of a double pointer 69.

The Selsyn system of which transformer 33 forms a part is shown diagrammatically in Fig. 13, in which 70 is a coarse transmitter for gun training, 33 is the transformer associated with the coarse gun train repeat back dial 68 and 71 is a coarse receiver motor in the gun train indicator 18. The transmitter 70 comprises a rotor 72 receiving single phase alternating current from mains 73 and 74, and a field 75 connected at points 76, 77 and 78 with corresponding points 79, 80 and 81 in the winding of the rotor 32 of the transformer 33, the winding of the stator 56 of the transformer being connected at points 82, 83 and 84 respectively with points 85, 86 and 87 of the stator 88 of the receiver motor 71 which also comprises a rotor 89 receiving single phase alternating current from the mains 73 and 74.

In the system just described the transmitter 70 and the receiver motor 71 are substantially the same and each is a mechanical duplicate of a miniature poly-phase alternator. The transformer 33, however, is a mechanical duplicate of a miniature wound type induction motor. The operation of the transmitter 70 and receiver motor 71 is, however, entirely different from that of poly-phase alternators and the operation of the transformer 33 is entirely different from that of an induction motor. As a result of the current through the rotor 72 of the transmitter, three different voltages are set up at the points 76, 77 and 78 and such voltages may be changed by turning the rotor 72. The same voltages will be set up at points 79, 80 and 81 respectively in the winding of the rotor 32 of the transformer 33 and, with a proper positioning of the transformer rotor 32 with respect to the transformer stator 56, the voltages at the points 82, 83 and 84, and consequently at the points 85, 86 and 87 of the receiver will be the same as the voltages at the points 76, 77 and 78 respectively. The receiver rotor 89 will then take a position corresponding to that of the transmitter rotor 72. If, however, a relative shifting of the transformer rotor 32 and stator 56 is effected, the angular signal is shown by the receiver motor 71 is the sum or difference of the angle transmitted by the transmitter and the angle resulting from the relative change in the positions of the rotor and stator of the transformer 33.

In addition to the coarse reading dial 68 of the gun train repeat back instrument there is a fine reading dial 90 which is graduated to indicate degrees and minutes up to ten degrees in connection with the pointer 69 so as to give the angle of gun train in degrees and minutes. The fine reading dial 90 is also controlled from the instrument train gear 22 and to this end provision is made of a gear 91 fixed on the shaft 29 and meshing with a gear 92 which, through a shaft 93, gears 94 and 95, shaft 96, gear 97 and a gear 98 fixed to the rotor 99 of a transformer 100, serves to turn the rotor 99 as required. Fixed to the parallax carriage 48 is a rack 101 meshing with a pinion 102 on a shaft 103 having fixed thereon a gear 104 meshing with a gear 105 fixed to the stator 105a and having loosely mounted thereon a gear 106 forming part of a differential 107 and meshing with a gear 108 fixed to the gear 98 and to the motor 99. The differential 107 also includes small pinions 109 and a gear 110 loosely mounted on the shaft 103 by means of a sleeve 111 on which is fixed a gear 112 operatively connected with the dial 90 by means of gear 113, 114 and 115, the gears 113 and 114 being connected by a shaft 116 and the gear 115 being connected to the dial 90 by means of a shaft 117.

Since the fine transformer 100 and the coarse transformer 33 operate at a ratio of, say, 72:1, the cam 49 on the parallax carriage 48 effects an adjustment of the transformer 33 relative to the adjustment of the transformer 100 so that the parallax correction is applied to both transformers in accordance with the ratio of their relative operations.

Figure 4:
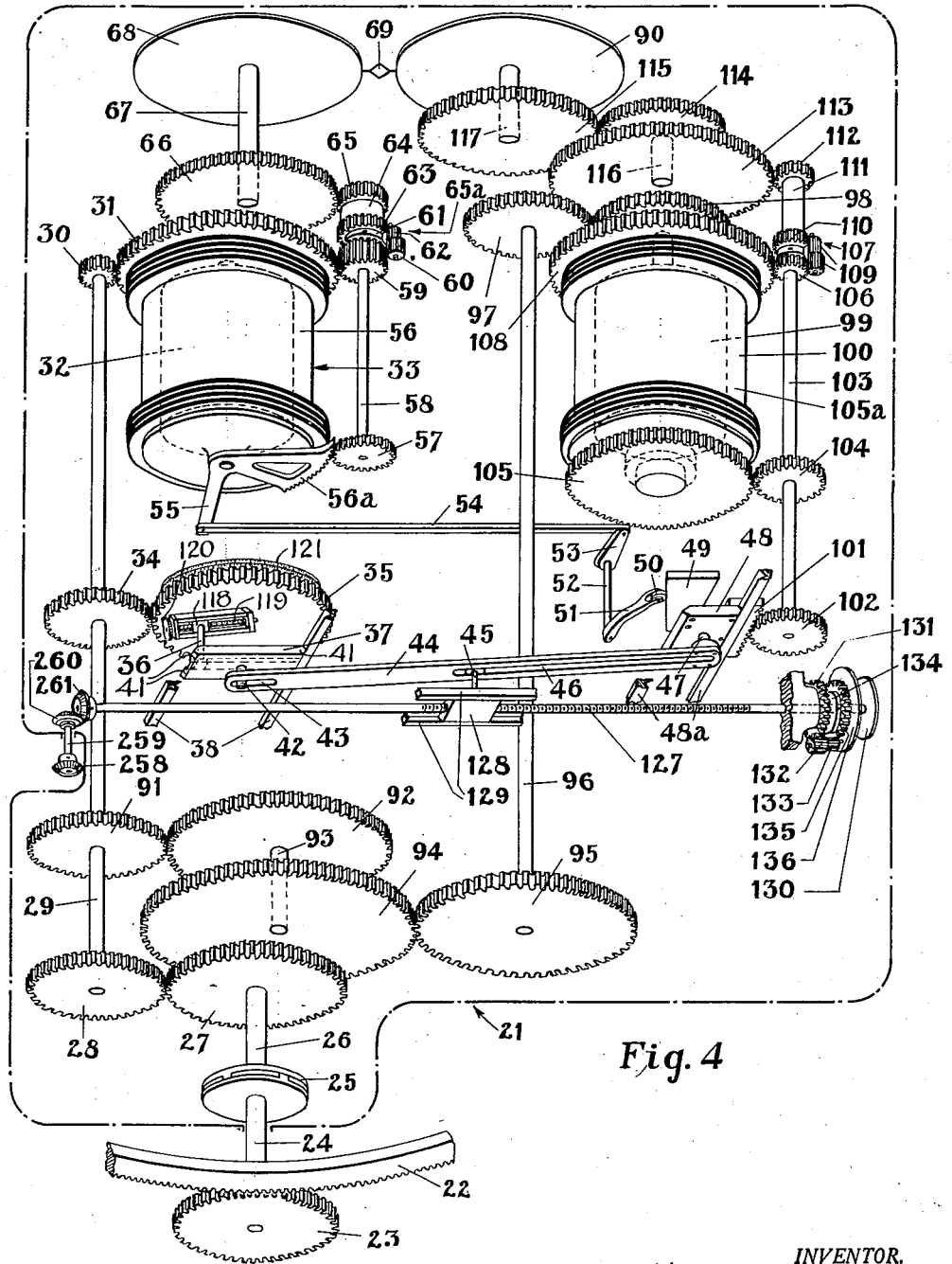
Figure 4 is a schematic view in elevation of the gun train repeat back instrument.

The axis about which the gun is trained is situated at a considerable distance from the reference point which may be at the director station and initial settings to compensate for such elements as the parallax base length or distance of the gun from the reference point and the parallax base angle which depends upon the bearing of the gun mount from the reference point, must be made before the instrument is put into use. Means for making such initial settings for the parallax base length and parallax base angle are shown in Figures 8, 9 and 10. As shown in Figs. 4 and 8, the pin 36 projects from a block or carriage 118 mounted at one face of the gear 35 and shiftable thereon by means of a screw 119 threaded through the block and provided with a pinion 120 projecting through a slot in the gear 35 and meshing with teeth on a crown gear 121, as best seen in Fig. 8. The distance of the center of pin 36 from the center of gear 35 is representative of the base length. The gear 35 and crown gear 121 are mounted by means of balls 122 and an annulus 123, having a ball race to receive the balls 122, on the casing of the gun train repeat back instrument. The crown gear 121, which is shown in Figs. 4 and 8, carries on its periphery two parallax base length scales one of which may be read by means of a pointer 124 and the other by a pointer 125 at 180 degrees from the pointer 124 as seen in Figs. 9 and 10. It will be seen that the two parallax base length scales have their graduations and numbers so arranged that the same numbers will be indicated simultaneously at the pointers 124 and 125, so that the reading can be taken from either of the parallax base length scales. The parallax base angle setting is effected by setting by means to be described hereinafter the parallax mechanism to its zero position, that is, the position of infinite range, turning the training gear to set a parallax base angle scale or dial 126 on the gear 35, which is shown in Fig. 9, to read 180 degrees in connection with a fixed pointer 126a and to adjust the dials on the top of the instrument with reference to the shafts 67 and 117 to read the amount of the parallax base angle. The pointer 124 is on the scale 126 at the 270° mark and pointer 125 is carried by a bracket projecting from the scale 126 at the 90° mark.

The adjustment for parallax for different ranges is effected by means of a screw 127, shown in Fig. 4, and which is threaded through a slide or carriage 128 carrying the pin 45 and slidably mounted in rails or guides 129. To determine the position of the screw 127 for zero setting, provision is made at one end of the screw 127 of a dial 130 fixed thereon, a fixed gear 131, gears 132 and 133 carried by a spider 134 fixed on the screw 127 and capable of actuating a gear 135 fixed to a dial 136. The gears 131 and 135 differ in the number of teeth so that when turned to bring single graduations on dials 136 and 130 into alinement with each other and with a fixed mark on the frame, the screw 127 must be in the proper position. One of the dials may be brought substantially to zero position without bringing the other to such a position. It would then be evident that a zero setting had not been obtained and it would be necessary to turn the screw 127 one or more times, according to the difference in the number of teeth, to bring the graduation on the second dial in coincidence with that on the other dial and with the fixed mark. The screw or shaft 127 may be turned by suitable means such as an erosion and parallax adjuster hereinafter described to compensate for changes in the parallax due to changes in range.

The gun elevation repeat back instrument 20 comprises coarse and fine dials 137 and 138 cooperating with a double pointer 139, so that the elevation in minutes may be read therefrom as shown in Fig. 12. The instrument train gear 22 meshes with a gear 140 of the gun elevation repeat back instrument and the movement of the gear 140 due to the training of the gun is transmitted by means of a shaft 141, a coupling 142, a shaft 143, bevel or miter gears 144, shaft 145 and gears 146 and 147 to the roller path correction gear 148. The gear 148 has on one face a block or carriage 149 slidably mounted on the gear 148 and provided with a pin 150 projecting into a block 151 mounted in a cross groove 152 of a carriage 153. The carriage 153 is provided with wheels 154 running in grooved rails 155 so that when the wheel 148 is turned the carriage 153 will be raised and lowered by means of the pin 150.

To determine the manner of actuation of the carriage 153 by the pin 150 provision is made of a screw 156 threaded through the block 149 and a pinion 157 fixed on the screw 156 and projecting through a slot in the gear 148 to mesh with a crown gear 158. As shown in Fig. 7 the gear 148 is supported for rotation by means including ball bearings 159. The gear 148 has thereon an annular scale or dial 160 adjacent a scale or dial 161 on the gear 158, as is clear from Figs. 6 and 7, and by loosening a screw 162, relative rotation may be effected between the gear 148 and the gear 158 so as to effect proper adjustment of the block 149, the screw 162 then being tightened to secure such adjustment to compensate for roller path inclination which may arise as in the secondary battery, from the camber of the deck.

The scale or dial 160 is graduated in degrees and is read against the fixed pointer 160a at the right, Fig. #6, and the inner scale or dial 161 is graduated in minutes representing maximum roller path inclination and is read against a pointer 161a which is at the zero graduation of the outer dial 160. When properly set the outer dial reads the train of the gun from the low point of the roller path and the inner dial reads the amount of maximum roller path inclination.

Mounted on the carriage 153 is a rack 163 which through a pinion 164 on shaft 165 rotates a stator element 166 of a Selsyn transformer 167, this motion being transmitted by means of a gear 168, a sector 169 and an arm 170 to a stator element 171 of a coarse Selsyn transformer element 172. The sector 169 also acts through a gear 173, shaft 174, gear 175 and gear 176 to turn a shaft 177 which as hereinafter described, assists in the actuation of both of the dials 137 and 138. The shaft 177 has fixed thereon a spider 177a of a differential gear 178 and a gear 179 meshing with a toothed sector 180 on an arm 181 fixed on a shaft 182 which carries a spider 183 of a differential gear 184 through which the coarse reading dial 137 is actuated.

Adjacent the gun elevation rack is a rack 185 which meshes with a gear 186 and acts therethrough to turn a shaft 187 and a gear 188. The gear 188 meshes with a gear 189 on a shaft 190 connected with the rotor 191 of the coarse Selsyn transformer 172, the motion of the shaft 190 being transmitted by means of gears 192 and 193 to a sleeve 194 surrounding the shaft 182 and carrying a gear 195 forming part of the differential gear 184. The spider 183 carries intermeshing gears 196 and 197 connecting the gear 195 with a gear 198 on a shaft 199 from which motion is transmitted by miter or bevel gears 200 to a shaft 201 carrying the coarse dial 137. Motion is also transmitted from the gear 189 by gears 203, 204, 205 and 206 to the rotor 207 of the fine transformer 167 and through gears 208 and 209 to a sleeve 210 carrying a gear 211 forming part of the differential gear 178. Connected with the gear 211 by small gears 212 on the spider 177a is a gear 213 mounted on a sleeve 214 rotatable on the shaft 177 and connected by bevel or miter gears 215 with the shaft 216 of the fine dial 138.

To adjust the rack 163 with reference to the carriage 153 provision is made of a screw 217 threaded into a lug 218 on the rack 163 and supported at its other end in a bracket 219 projecting from the carriage 152. The screw 217 may be turned by means of a pinion 220 mounted thereon and meshing with a gear 221 on a shaft 222 which may be turned by suitable means as by connections with an erosion and parallax adjuster to be described hereinafter under certain conditions, as, for example in connecting the gun elevation repeat back instrument with the erosion and parallax adjuster it becomes necessary to set the shaft 222 to a position corresponding to zero range and zero erosion or a no-rounds-fired condition. To this end provision is made of a dial 223 fixed on the shaft 222, and a dial 224 loose on the shaft 222 actuable thereby through a gear 225 fixed to the dial 224 a gear 226 fixed on the frame of the instrument and gears 223a mounted on a spider 227 on the shaft 222 and connecting the gears 225 and 226. Each of the dials 223 and 224 is provided with a single graduation (not shown) and when the shaft 222 is in zero position both of these graduations are in alignment with a graduation, not shown, on a fixed part of the instrument. The number of teeth on the two gears 225 and 226 differ as by one tooth, and when the shaft 222 is turned from its zero position the graduations on the two dials become relatively displaced a certain distance at each rotation of the shaft and are restored to alignment by returning the shaft 222 to zero position. This arrangement enables an accurate setting of the shaft 222 in its zero position.

Adjustment of the gun elevation repeat back instrument 20, and the gun train repeat back instrument 21, may be effected by an erosion and parallax adjuster 228 which is controlled by a range-setting crank 229 and a rounds-fired knob 230. The range setting crank 229 is connected through a shaft 231 and gears 232 and 233 with a range screw 234 mounted in ball bearings 235 and serving to feed a cam follower 236 having a stud 237 engaging in a groove 238 of a range cam 239 mounted on a shaft 240.

Figure 2:
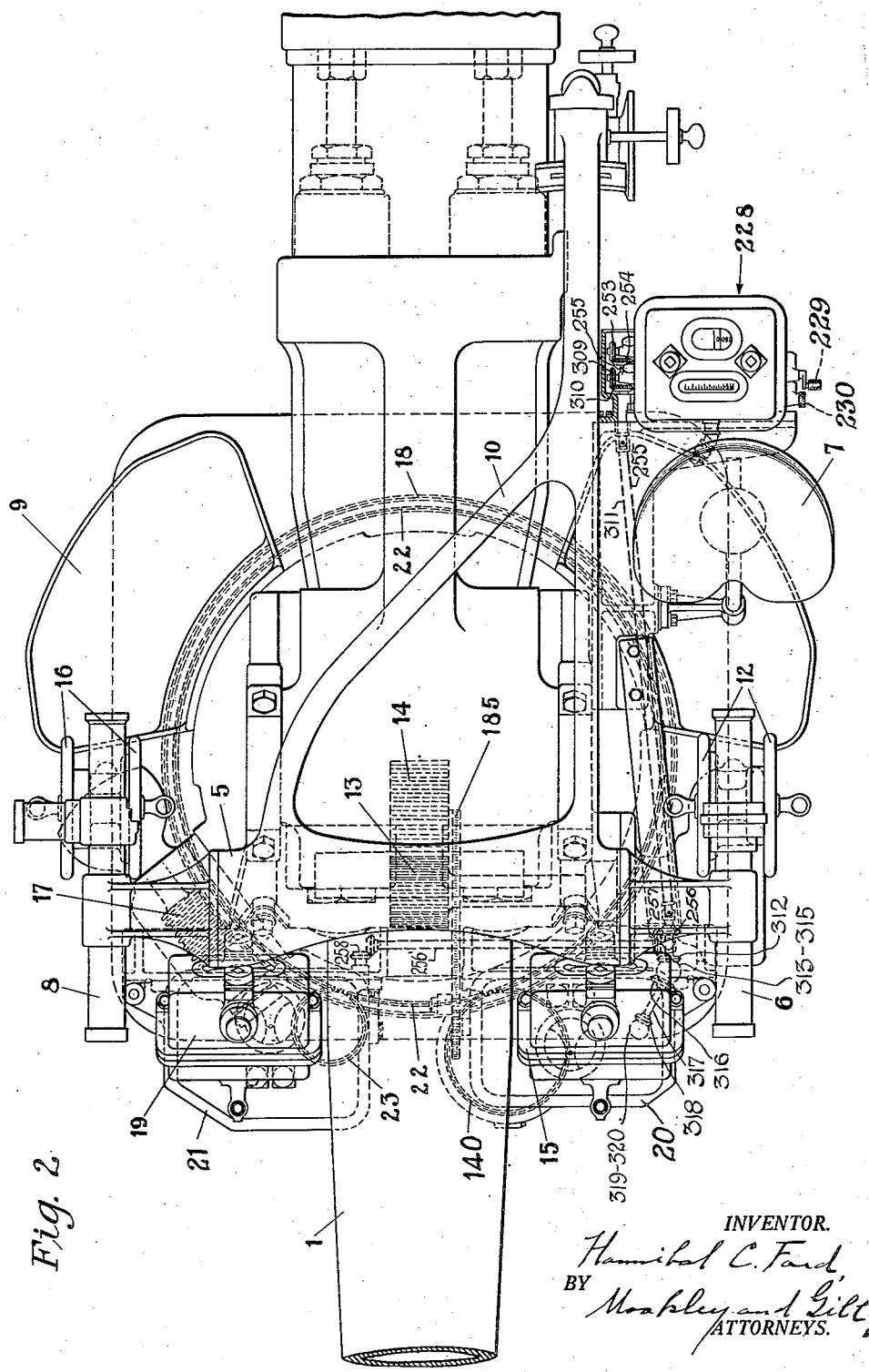
Figure 2 is a top plan view.

On the shaft 240 is a gear 241 connected through gears 242 and 243 with a clutch 244 which serves to drive the range cam 239 at a speed which will allow the range cam follower to follow the groove 238. The clutch 244 comprises a clutch pinion 245 meshing with the gear 243 and carrying two face ratchets 246. This pinion 245 is mounted on symmetrically disposed ball bearings 247 which serve to journal the pinion in the clutch shell. At the sides of the clutch pinion 245 are clutch driving ratchets 248 one arranged to drive the pinion 245 in one direction and the other to drive the pinion in the opposite direction, depending for effectiveness upon which way the screw shaft 234 is urged axially due to the engagement of the stud 237 in the groove 238. The spring-pressed backing clutches 249 are mounted in the ends of the casing in such a way that they are free to move axially but are prevented from rotating and serve to prevent the pinion 245 from being dragged in a reverse direction. The axial motion given to the screw 234 due to the engagement of the stud 237 in the groove 238 causes intermittent engagement of the pinion 245 by the driving ratchets 248 so that the clutch pinion will drive the cam shaft 240 as required. The shaft 240 is connected by spur gears 250, 251, shaft 252 and bevel gears 253 and 254 with a shaft 255 which extends along the side of the carriage to a position near the gun elevation repeat back instrument 20 where it is connected by bevel gears 256 and 257, a transverse shaft 256', shown in Fig. 2, and a bevel gear with a bevel gear 258 adjacent the gun train repeat back instrument 21. The gear 258 is fixed on the rear end of a shaft 259 extending into the instrument 21 and connected by bevel gears 260 and 261 with the screw 127.

The range screw 240 is also connected by means of gears 266 and 267 with a shaft 268 on which is mounted the range-drum 270 which is provided with a scale wrapped helically around it and calibrated to read ranges from 1000 yards to infinity. Overlying the range-drum 270 is a shutter 271 having a window 272 and mounted on a screw 273 actuable from shaft 268 by means of spur gears 274 and 275. The arrangment of the graduations on the drum and the opening or window in the shutter being such that at least two adjacent numbers can be seen through the range drum shutter, the graduations being computed so as to give the proper parallax correction function for use in the gun train repeat back. Attached to the sides of the shutter 271 are ribbons 276 which are always held taut by spring-actuated rollers 279 and cover the portion of the range scale which is not to be read. The turning of the shaft 240 generates a range function corresponding to the range value disclosed through the window 272 and this range function is transmitted to the gun train repeat back mechanism where it is combined with the bearing and base-line parallax to obtain the complete parallax correction.

To adjust the gun elevation repeat back instrument an extension of the range screw 234 is provided with a gear 280 which meshes with a gear 281 of a differential 282, the gear 281 being of sufficient thickness to permit movement of the gear 280 with the screw 234 without breaking the connection between the two gears. The gear 281 is connected by small gears 283 on the spider 284 of the differential with a gear 285 which is driven by the rounds fired handle 230 through a shaft 286, gears 287 and 288, shaft 289 and gear 290. The motion of the gears 281 and 285 effect movement of the spider 284 and a shaft 291 to which the spider is attached to actuate, through gears 292 and 293, an erosion shaft 294 in the form of a screw to feed a cam follower 295 having a stud 296 projecting into a groove 297 of an erosion cam 298. Due to the connection between the follower 295 and the erosion cam 298, the shaft 294 is moved back and forth on ball bearings 299 and serves to control a clutch 300, which may be similar to clutch 244, so that the clutch pinion 301 is turned in one direction or the other and this motion is transmitted through the gears 302, 303, 304 and shaft 305 to actuate the erosion cam 298 and feed the stud 296 along the groove 297. This movement of the shaft 305 is transmitted by gears 306 and 307, shaft 308 and bevel gears 309 and 310 to a shaft 311 extending along the gun carriage to a point adjacent the gun elevation repeat back instrument 20. At this point the shaft 311 is connected by bevel gears 312 and 313 with a vertical shaft 314 provided at its lower end with a bevel gear 315 meshing with a bevel gear 316 on a horizontal shaft 317 entering the casing of the gun elevation repeat back. The shaft 317 is connected by bevel gears 318 and 319 and spur gears 320 and 321 with the shaft 222. By the connections just described the shaft 222 may be rotated to effect proper adjustment of the gun elevation repeat back instrument in accordance with the actuation of the erosion and parallax adjuster. The position to which the rounds fired knob 230 is to be turned is determined by bringing a pointer 322 to the proper position along a rounds-fired scale 323 the pointer 322 being positioned by means of a screw shaft 324 actuable from the shaft 289 by means of gears 324a, 325 and 326.

Figure 3:
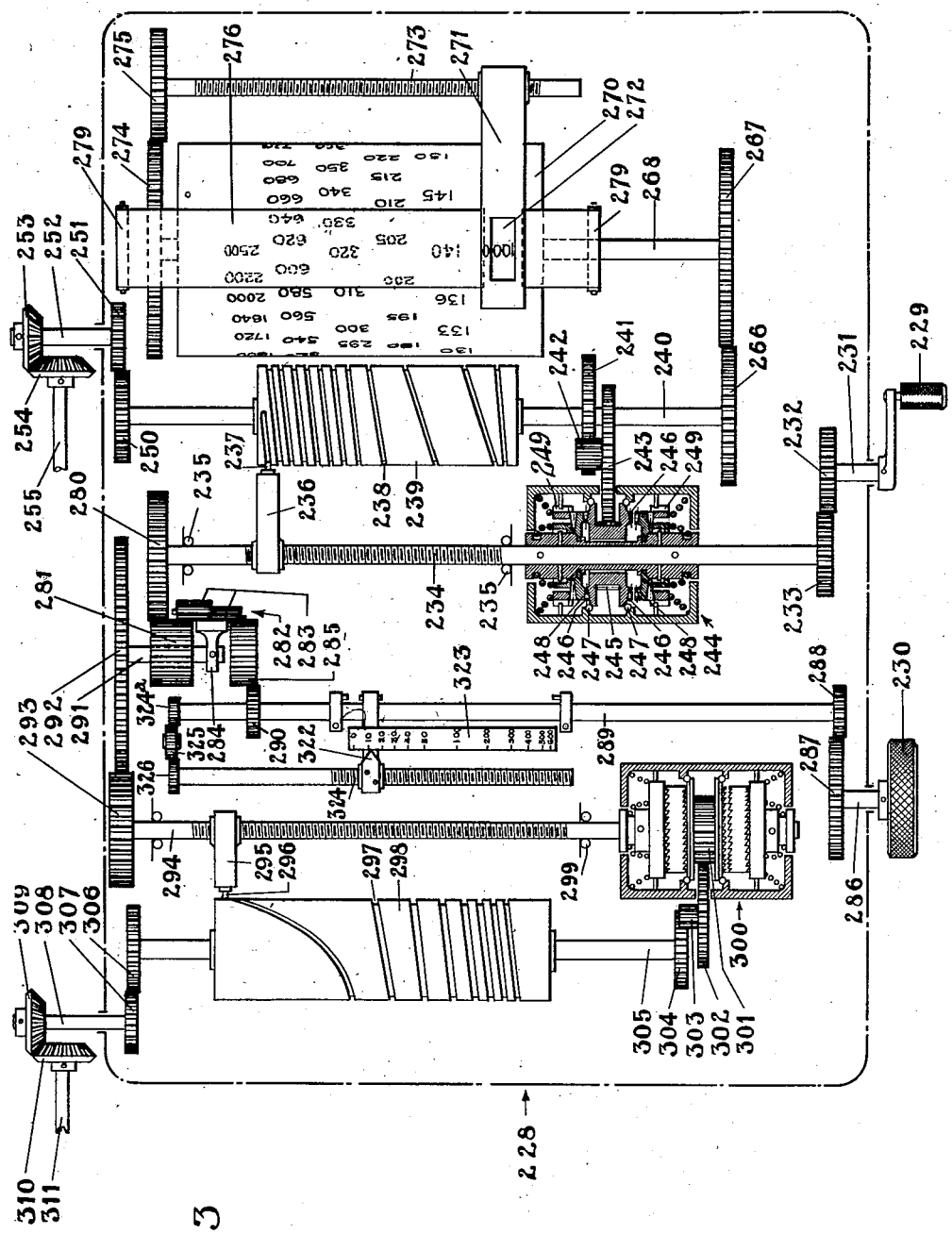
Figure 3 is a diagrammatic plan view of the erosion and parallax adjuster.

The adjuster 228 does not actually generate a parallax correction but supplies range functions which are transmitted to the gun train repeat back instrument where they are combined with other quantities to obtain the parallax correction. The design of the gun train repeat back instrument is based on the travel of its range carriage 128 being equal to:

$$\frac{C}{KR}$$

where C and K are constants dependent upon the designs of this instrument and of the adjuster 228, and R equals the range. This function is plotted spirally on the range drum 270, and is based on the tangent of the parallax correction angle being equal to $$\frac{B}{R}$$

when the line of sight from the director to the target is perpendicular to the center line of the ship, and where B is base line between the director and the gun. For the small angles used here the angle may be taken as proportional to the tangent so that the movement of the range carriage 128 is proportional to an angle which is a factor of the parallax correction. By turning the range setting crank 229 the drum 270 may be turned to display the desired range reading through the window 272 of the shutter 271. During this operation the shaft 240 shown in Fig. 3, acting through gears 250, 251, shaft 252, bevel gears 253, 254, shaft 255 (see Fig. 1), bevel gears 256, 257, shaft 256' (see Fig. 2), bevel gears 258 (see Fig. 4), shaft 259 and bevel gears 260 and 261, turns the screw 127 and positions the carriage 128 in accordance with the range function that corresponds to the range value that is seen through the window 272 of the adjuster 228.

As the pin 36 that is shown in Fig. 4 to be mounted on block 118 has been shifted an amount corresponding to the value of the base length, the distance from its center to the center of the training angle gear 35 is representative of the base length between the point of reference, as the director station, and the particular gun. In the explained manner, the range carriage 128 is shifted along the screw 127 to a position representative of the range indicated by the adjuster 228. In Fig. 4, the left hand end of the slot 46 in the parallax lever 44 corresponds to the lowest range that in all probability will be dealt with, while in progressing toward the right the slot 46 is representative of increasing range, its right hand end being indicative of infinite range.

Now, as the sight at the director is brought to bear upon a target, the training angle is transmitted to gun train repeat back shown in Fig. 4, in the manner already set forth, the training angle gear 35 being turned accordingly. The block 118 on one side of the gear 35 is also moved in an arc, its pin 36 shifting the training angle carriage 37. The pin 42 on the carriage 37 shifts one end of the parallax lever 44 so that the latter turns about the pin 45 that is mounted on the range carriage 128.

Inasmuch as the parallax angle varies inversely as the range, if the range carriage 128 has been shifted toward the right in Fig. 4 for a greater range, the angular displacement of the right hand end of the parallax lever 44 will be diminished to move the parallax carriage 48 a smaller amount for a lesser parallax correction. Conversely, if the range carriage 128 be moved toward the left in Fig. 4, the right hand end of the parallax lever 44 will be angularly displaced by a larger amount, thus shifting the parallax carriage 48 to give a larger parallax correction. In the case of infinite range, the range carriage 128 will be shifted to bring its pin 45 axially coincident with the pin 47 on parallax carriage 48, whereupon, when the parallax lever 44 is turned in response to turning of the training angle gear 35, there will be no actuation of the parallax correction carriage 48, since no parallax angle correction is made for infinite range. Whatever parallax correction is made is introduced into the transformers 33 and 100 by the previously described connections, so that as may be required the parallax correction is added to or subtracted from the training angle that has been transmitted from the director station to these transformers in the manner already explained.

The parallax correction may have a value varying from zero to a maximum positive or to a maximum negative value. If the line of sight from the director station and the line of fire from the gun coincide, there is zero parallax. In the mechanism of Fig. 4, when there is zero parallax, the pins 42, 45 and 47 will be in a straight line parallel with the range screw 127, whereby any movement of the range carriage 128 in response to a change in range will not be accomplished by an angular movement of the parallax lever 44, and, therefore, the parallax carriage 48 will not be moved, and zero parallax will be registered by carriage 48. When the training gear 35 causes the parallax lever 44 to have its right hand end, as shown in Fig. 4, swing to one side of its zero parallax position, it may travel to a position of maximum positive parallax correction, while if swung to the other side thereof it may go to a maximum negative parallax correction. Obviously, intermediate corrections transpire proportional to the sine of the angle of train from angle of zero parallax. The parallax corrections, as represented by the movements of the parallax correction carriage 48, are carried by the hitherto described connections to the transformers 33 and 100, turning their respective stators 56 and 105a to add or subtract the parallax corrections.

The erosion correction generated by the adjuster 228 is the correction in minutes of the elevation of the gun necessary to compensate for the loss in muzzle velocity due to erosion. The correction for erosion is determined by the number of rounds fired and for a fixed value of the erosion the correction is determined by the range. The generation of the erosion correction is based upon the assumption that:—

$$\frac{\text{Erosion correction for X rounds at Y range}}{\text{Erosion correction for 600 rounds at Y range}} \text{ equals}$$

$$\frac{\text{Erosion correction for X rounds at 20,000 yards range}}{\text{Erosion correction for 600 rounds at 20,000 yards range}}$$

or that

Erosion correction for X rounds at Y range equals

Erosion correction for 600 rounds at Y range times $$\frac{\text{Erosion correction for X rounds at 20,000 yds.}}{\text{Erosion correction for 600 rounds at 20,000 yds. range.}}$$

The 600 rounds and 20,000 yds. are arbitrary quantities assumed to obtain a value on which to base the computation and hence the denominator of the fraction is a constant. The instrument 228 computes the value of this fraction and through the shaft 308 transmits the correction to the gun elevation repeat back instrument as hereinbefore described.

The groove 238 of the range cam 239 is in a form such that different points thereof correspond to the logarithms of the erosion corrections for 600 rounds and for ranges corresponding to those indicated on the range scale. As stated previously the function of range plotted on drum 270 is $$\frac{C}{KR}$$

so that rotation of the range cam 239 is proportional to this function, and it may be repeated that it is this function that is transmitted to the gun train repeat back mechanism where it is combined with the bearing and base-line factors to obtain the parallax correction. To obtain the form of the groove 238, the values of the function $$\frac{C}{KR}$$

may be graphically plotted against range. On the same graph the values of the log of erosion correction for 600 rounds may be plotted against range. Therefore, for a given value of range, there is a value of erosion correction for a corresponding value of the function $$\frac{C}{KR},$$

and the form of the groove 238 may be determined by plotting log erosion correction for 600 rounds against $$\frac{C}{KR}.$$

The follower 236 is on the screw 234 connected with gear 281, the displacement of which therefore represents the logarithm of the erosion correction for 600 rounds at Y range. The amount of turning of the screw 234 corresponds with the displacement and the turning of the gear 281 at one side of the differential represents the logarithm of the erosion correction for 600 rounds at Y range. Also the position of the graduations on the scale 323 represent the logarithm of the erosion corrections for an arbitrary constant range, in this case 20,000 yards, and for the number of rounds fired as marked on the scale. The turning of the gear 285 at the corresponding side of the differential represents for any position of the gear the logarithm of the erosion for X rounds (as read on the scale 323) at 20,000 yards, and the position of the follower 295 on the screw 294 represents the logarithm of the product of the two quantities in accordance with the logarithms of which the two sides of the differential 282 were operated.

The cam 298 consists of a drum having a groove 297 in the form of a logarithmic curve such that the rotation of the drum, as controlled by the screw 294, follower 295 and clutch 300, represents the number whose logarithm is represented by the position of the follower 295 on the screw 294. Such rotation of the cam or drum 297 is transmitted to the gun elevation repeat back to effect the necessary correction.

I claim:—

1. In a calculating machine, means for calculating logarithmic functions of two numbers including interconnected elements operable in determining the function of one of the numbers and arranged to apply unequal displacements to the means interconnecting them, compensatory means for the unequal displacements, and means operable by said calculating means for combining said logarithmic functions.

2. In a calculating machine, means for calculating logarithmic functions of two numbers including logarithmically acting means operable in determining the function of one of the numbers, operating mechanism for said calculating means, a portion of which is adapted to be continuously operated, said portion having means responsive to said logarithmically acting means to effect an intermittent drive thereto, means operable by said calculating means for combining the logarithmic functions, and means operable by said combining means for obtaining a value corresponding to the combination of said logarithmic functions.

3. In an instrument of the class described, a differential, means to actuate one side of the differential in accordance with the logarithm of a number, said means comprising a plurality of members one of which is controlled by uniform and variable displacements while said side of the differential is being actuated, means to actuate the other side of the differential in accordance with the measure of the logarithm of a second number, a device actuated by the differential in accordance with the algebraic sum of the two logarithms and means actuable by said device to generate a value corresponding to the resulting logarithm.

4. In an instrument of the class described, a manually operable member, an indicating drum operable by said member provided with indications of predetermined quantities arranged in accordance with functions of other quantities, a device operable concomitantly with said indicating means to generate the logarithm of a value corresponding to the indicated quantity, a second manually operable member, a device operable by said second member to indicate when the logarithm of the proper number has been generated thereby, and means including differential gearing operabe by said members for generating the sum of said logarithms.

5. In an instrument of the class described, a manually operable member, indicating means operable by said member provided with indications of predetermined quantities arranged in accordance with functions of other quantities, a device operable concomitantly with said indicating means to generate the logarithm of a value corresponding to the indicated quantity, a second manually operable member, a device operable by said second member to indicate when the logarithm of the proper number has been generated thereby, means including differential gearing operable by said members for generating the sum of said logarithms, and means actuable by the logarithm-adding means to move in proportion to the antilog of the said sum.

6. In a multiplying device, in combination, a drum rotatable in fixed relation to a given value, a cam and follower to convert said rotation into a factor corresponding to the given value, a second device settable in accordance with another factor, and means including a differential operable by said follower and said device to generate the product of said factors.

7. In a calculating device, a drum rotatable in a fixed relation to a given value, a cam coacting with said drum and a follower operable to generate the logarithm of a number of different value, a second device operable to generate the logarithm of a second number, and means including a differential operable by said devices to generate the logarithm of the product of said numbers.

8. In a calculating device, a device settable in accordance with a number and operable to generate a logarithm for use in effecting a correction of the value indicated by the number, a second device operable to generate the logarithm of a second number of which the first mentioned number is a function, means including a differential operable by said devices to generate the sum of said logarithms and a cam and follower to generate the antilog of said sum and constituting said correction.

9. In apparatus for controlling guns from a director station, means for receiving gun elevation directions from the director station, means for receiving gun train directions from the director station and including means for adjustment to compensate for parallax effects arising from the displacement of the gun relative to the director station, two operating members, means actuable by one of said members for calculating a range function and running the same into the gun-train-direction receiver to combine with said adjustment means to effect a parallax correction for the required range, and means actuable by both of said operating members for calculating a second range function and an erosion function and combining them to operate the gun-elevation receiver so as to correct the reading of the gun elevation receiver.

10. In apparatus for controlling guns from a director station, an instrument adjacent a gun to receive gun-training indications from the director station and including parallax-adjusting means to compensate for the displacement of the gun from the director station a device included in said means adjustable in accordance with the various displacements of guns from the director station, a range drum having a suitable range function plotted helically thereon and range values at points representing the corresponding values of the range function, a shutter having a sight through which the range numbers may be read, means movable with the drum to feed the shutter along the drum, and means actuable in accordance with the movement of the drum to supplement the action of said parallax-adjusting means and cause said instrument to be set in accordance with the bearing of the target from the gun.

11. In an erosion and parallax adjuster for gun-sighting apparatus, a member to set up a range factor, a drum indicator operable by said member, a cam controlled by said indicator and operable by said member, a second member to set up a rounds fired value, a differential controlled by said members, and means actuated by said differential to operate a gun elevation adjusting shaft and thereby correct the indication for gun elevation in accordance with the range and the number of rounds fired.

12. In a calculating device, in combination, a manually operable member, a screw operable thereby, a cam follower threaded on said screw, a cam engaging said follower, an indicator removed from said follower and operably connected with said cam to indicate the position of said follower, means controlled by the coaction of said cam and follower to actuate said cam and consequently said indicator from said screw, a second manually operable member, an indicator including a scale and a pointer operable by the second member, and a differential operable by said members to combine the movements effected by said members.

13. In a calculating device, in combination, a manually operable member, a screw operable thereby, a cam follower threaded on said screw, a cam engaging said follower, an indicator operably connected with said cam to indicate the position of said follower, means controlled by the coaction of said cam and follower to actuate said cam and consequently said indicator from said screw, a second manually operable member, an indicator including a scale and a pointer operable by the second member, a differential operable by said members to combine the movements effected by said members, means operable by said differential to generate a value corresponding to the combination of the values generated by said members and comprising a clutch and means including a cam and cam follower for controlling said clutch and an angle correcting device operable by the last mentioned means in accordance with the combination of the values generated by said members.

14. In fire control apparatus, a gun train repeat back, a gun elevation repeat back, and an erosion and parallax adjuster comprising a rounds fired element, a range setting element, means actuable by the range setting element to adjust the gun train repeat back for parallax, and means actuable by the rounds fired element and the range setting element to adjust the gun elevation repeat back for erosion and range.

15. In fire control apparatus, a range drum having numbers corresponding to different ranges plotted helically thereon, a shutter to travel along the drum and having an opening to expose any one of said numbers, a shutter-feeding screw parallel to the axis of the drum and geared thereto to cause suitable movement of the shutter relative to the rotation of the drum, means to turn said drum and introduce into the apparatus a parallax adjustment corresponding to the range number seen through the shutter opening, means in said apparatus operable in part in accordance with gun training angles and responsive to said adjustment to effect a parallax correction, a device included in the last mentioned means adjustable in accordance with the various displacements of guns from the director.

16. In fire control apparatus, means for receiving gun elevation directions, a rounds-fired setting member, a rounds-fired indicator actuable by said setting member, a range setting member, a range indicator actuable by the range-setting member, a differential actuable in accordance with the setting of both of said members, an erosion screw actuable by said differential, a cam follower actuable by said screw, an erosion drum having a groove to receive the cam follower and arranged in helical form on the drum, and a clutch device controllable by the coaction between the drum and follower to cause rotation of the drum such as to feed the cam follower at the same rate as it is fed by the screw and thereby effect suitable adjustment of the apparatus, and means for introducing an elevation correction from the erosion drum to said gun elevation directions.

17. In apparatus for controlling guns from a director station, means for receiving gun train directions from the director station, means for receiving gun elevation directions, an operating element, and means actuable by the operating element for generating one range function and introducing a corresponding parallax correction in the gun train directions and for generating a second range function and introducing an elevation correction in the gun elevation directions.

18. In apparatus for controlling guns from a director station, means for receiving gun train directions from the director station, means for receiving gun elevation directions, an operating element, and means actuable by the operating element for generating one range function and introducing a corresponding parallax correction in the gun train directions and for generating a second range function for correcting the gun elevation directions, a second operating element, means actuable by said second element for generating an erosion function for correcting the gun elevations, and means controllable by the second and third generating means for generating a correction for the gun elevation.

19. In apparatus for controlling guns from a director station, a gun train direction receiver, a gun elevation direction receiver, an operating element, means operated by said element for generating directly a range function for correction of the gun elevation due to erosion and indirectly a second range function for parallax correction of the gun train receiver, a second operating element, means actuable by the second operating element for generating a rounds fired function for correction of the gun elevation receiver, and means for combining the first range function and the rounds fired function and thereby generating a correction for the gun elevation receiver.

In testimony whereof I affix my signature.

HANNIBAL C. FORD.

---

CERTIFICATE OF CORRECTION.

Patent No. 1,813,534.  Granted July 7, 1931, to

HANNIBAL C. FORD.

It is hereby certified that error appears in the printed specification of the above numbered patent requiring correction as follows: Page 3, line 18, for "is" read as; line 43, for "motor" read rotor; page 7, line 3, for "accomplished" read accompanied; page 8, lines 47 and 48, claim 4, for the misspelled word "operabe" read operable; page 9, line 23, claim 12, after "follower" insert a parallax adjuster operable by said cam; and that the said Letters Patent should be read with these corrections therein that the same may conform to the record of the case in the Patent Office.

Signed and sealed this 29th day of September, A. D. 1931.

(Seal)

M. J. Moore,
Acting Commissioner of Patents.